(12) United States Patent
Ma et al.

(10) Patent No.: US 12,373,429 B1
(45) Date of Patent: Jul. 29, 2025

(54) NON-PARTITIONED FIELD QUERY OPTIMIZATION IN DATA LAKES

(71) Applicant: Zoom Communications, Inc., San Jose, CA (US)

(72) Inventors: Jiyue Ma, Hangzhou (CN); LeiLei Ruan, Troy, MI (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/514,636

(22) Filed: Nov. 20, 2023

(51) Int. Cl.
*G06F 16/2453* (2019.01)
*G06F 16/27* (2019.01)

(52) U.S. Cl.
CPC ...... *G06F 16/24534* (2019.01); *G06F 16/278* (2019.01)

(58) Field of Classification Search
None
See application file for complete search history.

(56) References Cited

U.S. PATENT DOCUMENTS

| | | | | |
|---|---|---|---|---|
| 8,150,870 B1 * | 4/2012 | Peddy | ............... | G06F 16/119 |
| | | | | 707/968 |
| 8,898,105 B1 * | 11/2014 | Peddy | ............... | G06F 16/487 |
| | | | | 707/602 |
| 8,935,317 B2 * | 1/2015 | Jain | ................... | G06F 9/5094 |
| | | | | 718/1 |
| 8,938,444 B2 * | 1/2015 | Xu | ...................... | G06F 16/278 |
| | | | | 707/753 |
| 9,239,838 B1 * | 1/2016 | Peddy | ............... | G06F 16/119 |
| 9,460,186 B2 * | 10/2016 | Liu | .................. | G06F 16/2455 |
| 10,318,491 B1 | 6/2019 | Graham et al. | | |
| 10,872,101 B2 * | 12/2020 | Li | ........................ | G06F 16/278 |
| 11,138,232 B1 * | 10/2021 | Paraschiv | ......... | G06F 16/182 |
| 11,461,356 B2 | 10/2022 | Wilson et al. | | |
| 11,531,666 B1 * | 12/2022 | Park | .................. | G06F 16/2272 |
| 11,816,081 B1 * | 11/2023 | Opincariu | ......... | G06F 16/2272 |
| 2011/0320520 A1 * | 12/2011 | Jain | ..................... | G06F 9/5072 |
| | | | | 709/224 |
| 2013/0173595 A1 * | 7/2013 | Xu | ...................... | G06F 16/278 |
| | | | | 707/E17.014 |

(Continued)

FOREIGN PATENT DOCUMENTS

WO 2017096941 A1 6/2017

OTHER PUBLICATIONS

Data Lakes: A Survey of Functions and Systems (Year: 2023).*

(Continued)

*Primary Examiner* — Kim T Nguyen
(74) *Attorney, Agent, or Firm* — Young Basile Hanlon & MacFarlane, P.C.

(57) ABSTRACT

A mapping between values of a non-partitioning field and containing Parquet files of a data lake is generated. The containing Parquet files include the values of the non-partitioning field. The data lake is organized into partitions and Parquet files. Each partition includes a subset of the Parquet files. A query of the data lake that includes the non-partitioning field in a filter is received. A subset of the containing Parquet files corresponding to the filter is identified based on the mapping. The query is rewritten into a rewritten query that includes filters that are based on the subset of the containing Parquet files. Results of executing the rewritten query are transmitted or displayed.

20 Claims, 10 Drawing Sheets

(56) References Cited

U.S. PATENT DOCUMENTS

| | | | | |
|---|---|---|---|---|
| 2015/0317345 A1* | 11/2015 | Liu | ................ | G06F 16/278 |
| | | | | 707/741 |
| 2018/0225353 A1* | 8/2018 | Li | ................ | G06F 16/2282 |
| 2020/0257675 A1* | 8/2020 | Wei | ................ | G06F 16/24553 |
| 2021/0232603 A1* | 7/2021 | Sundaram | ............ | G06F 16/2358 |
| 2021/0232604 A1* | 7/2021 | Sundaram | ......... | G06F 16/24534 |
| 2022/0222269 A1* | 7/2022 | Cox | ................ | G06F 16/256 |
| 2023/0409545 A1* | 12/2023 | Gupta | ................ | G06F 16/211 |
| 2024/0195675 A1* | 6/2024 | Thomas | ................ | H04L 41/069 |
| 2024/0231961 A1* | 7/2024 | Thomas | ................ | G06F 9/542 |

OTHER PUBLICATIONS

Qbeast, Indexing and Sampling on Data Lake(house)s with Qbeast-Spark, https://qbeast.io/indexing-and-sampling-on-data-lakehouses-with-qbeast-spark/, Jan. 25, 2022, 15 pages.

* cited by examiner

| CUSTOMER ID | PATH | FILENAME |
|---|---|---|
| ALICECO | YEAR=2023/MONTH=01/ | DATA_JAN_2023.PARQUET |
| ALICECO | YEAR=2023/MONTH=02/ | DATA_FEB_2023.PARQUET |
| ALICECO | YEAR=2024/MONTH=01/ | DATA_JAN_2024.PARQUET |
| BOBCO | YEAR=2023/MONTH=01/ | DATA_JAN_2023.PARQUET |
| BOBCO | YEAR=2023/MONTH=02/ | DATA_FEB_2023.PARQUET |
| BOBCO | YEAR=2024/MONTH=01/ | DATA_JAN_2024.PARQUET |
| CHARLIECO | YEAR=2023/MONTH=01/ | DATA_JAN_2023.PARQUET |

FIG. 5B

```
# 1. IMPORT THE REQUIRED MODULE
FROM PYSPARK.SQL IMPORT SPARKSESSION

# 2. DEFINE A FUNCTION TO GENERATE A FILE MAPPING  ─── 572
DEF GENERATE_MAPPING(FIELD_NAME, DATA_LAKE_ROOT):
    # 3. CREATE A SPARK SESSION                    ─── 574
    SPARK = SPARKSESSION.BUILDER.APPNAME("GENERATEMAPPING").GETORCREATE()
    TRY:
        # 4. READ ALL PARQUET FILES WITH MERGED SCHEMA RECURSIVELY FROM THE DATA LAKE
        DF = SPARK.READ.OPTION("MERGESCHEMA", "TRUE").PARQUET(DATA_LAKE_ROOT + "**/*.PARQUET")
        # 5. CHECK IF THE SPECIFIED FIELD EXISTS IN THE DATAFRAME
        IF FIELD_NAME IN DF.COLUMNS:
            # 6. FILL NULL VALUES AND FILTER OUT ROWS WHERE THE FIELD IS NULL  ─── 580
            DF = DF.FILLNA({FIELD_NAME: 'UNKNOWN'}).FILTER(DF[FIELD_NAME].ISNOTNULL())
            # 7. CREATE A NEW DATAFRAME WITH THE DESIRED COLUMNS  ─── 582
            RESULT = DF.SELECT(FIELD_NAME, "FILE_PATH", "FILE_NAME").DISTINCT()
            # 8. RETURN THE RESULT
            RETURN RESULT
        ELSE:
            # 9. RETURN NONE IF THE SPECIFIED FIELD DOES NOT EXIST IN THE PARQUET FILES
            RETURN NONE
    FINALLY:
        # 10. STOP THE SPARK SESSION TO RELEASE RESOURCES
        SPARK.STOP()
```

FIG. 5C

```
# DEFINE THE QUERY_DATA_LAKE FUNCTION
DEF QUERY_DATA_LAKE(FIELD_NAME, DATA_LAKE_ROOT):
    TRY:
        # CREATE A SPARK SESSION
        SPARK = SPARKSESSION.BUILDER.APPNAME("QUERYDATALAKE").GETORCREATE()

# READ PARQUET FILES WITH MERGED SCHEMA RECURSIVELY FROM THE DATA LAKE
        DF = SPARK.READ.OPTION("MERGESCHEMA", "TRUE").PARQUET(DATA_LAKE_ROOT + "**/*.PARQUET")

# CREATE A TEMPORARY SQL VIEW WITH THE NAME "PARQUET_DATA"
        DF.CREATEORREPLACETEMPVIEW("PARQUET_DATA")

# QUERY FOR DISTINCT VALUES OF THE SPECIFIED FIELD AND LIST ASSOCIATED PARQUET FILES
        RESULT_DF = SPARK.SQL(F"""
            SELECT
                {FIELD_NAME},
                FILE_PATH,
                FILE_NAME
            FROM
                PARQUET_DATA
        """)

# RETURN THE RESULT
        RETURN RESULT_DF

FINALLY:
        # STOP THE SPARK SESSION TO RELEASE RESOURCES
        SPARK.STOP()
```

FIG. 5D

NON-PARTITIONED FIELD QUERY OPTIMIZATION IN DATA LAKES

FIELD

This disclosure generally relates to data lakes, and, more specifically, to querying data lakes with filters that include non-partitioning fields.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 5B illustrates an example of data distribution in the data lake of FIG. 5A.

FIG. 5C illustrates sample code for generating a mapping similar to that shown in FIG. 5B.

FIG. 5D illustrates another sample code for generating a mapping similar to that shown in FIG. 5B.

DETAILED DESCRIPTION

Figure 1:
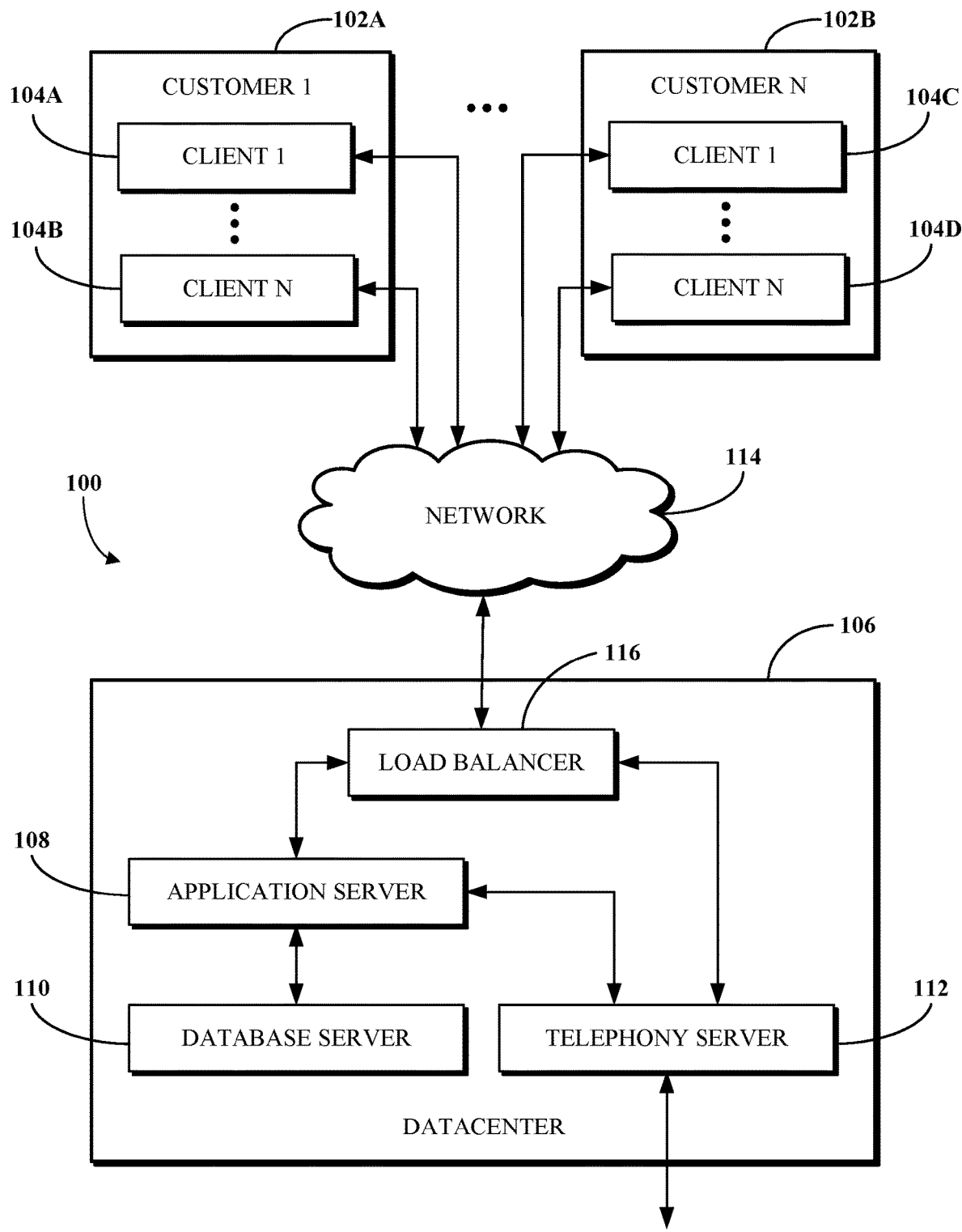
FIG. 1 is a block diagram of an example of an electronic computing and communications system.
Figure 3:
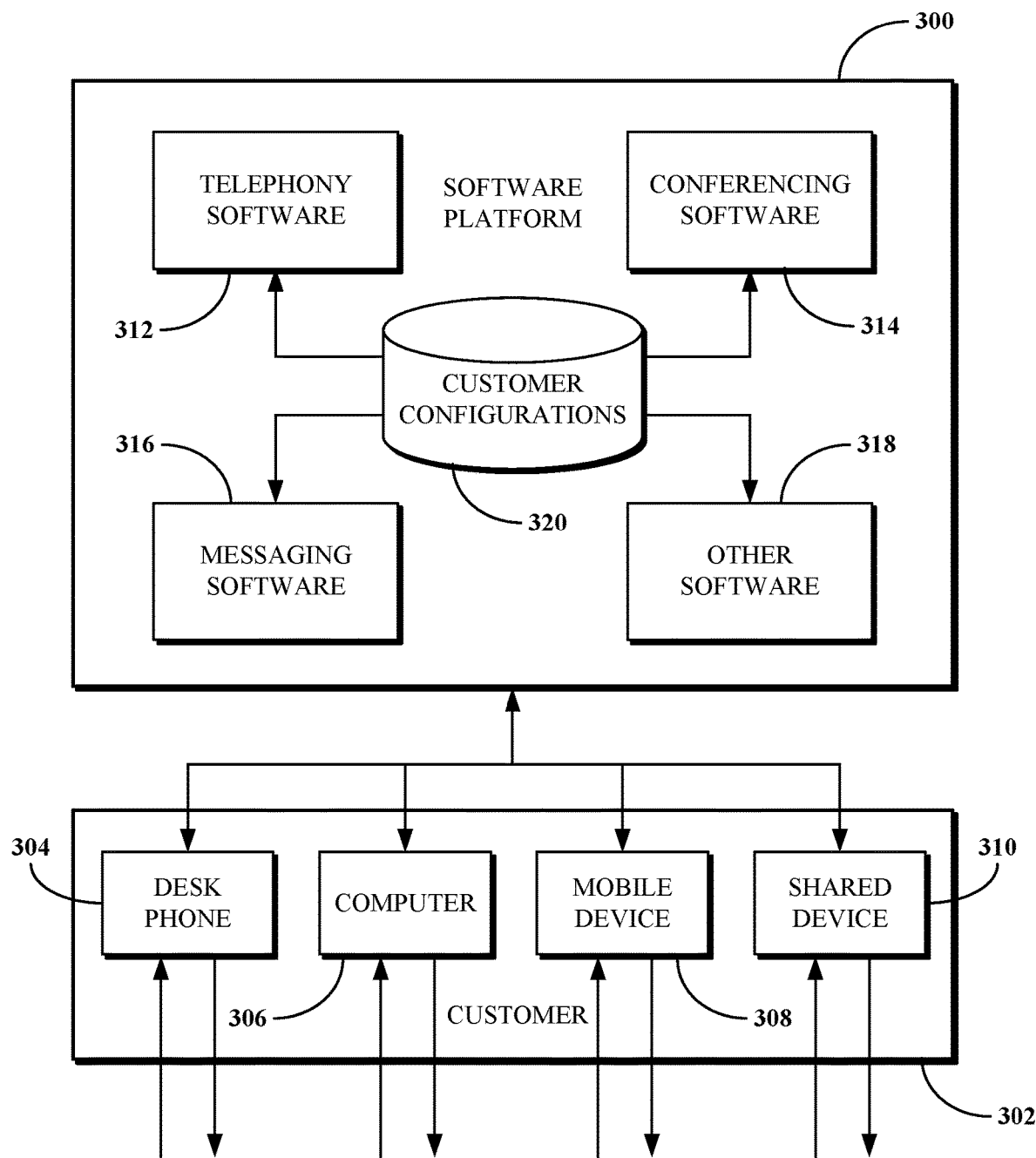
FIG. 3 is a block diagram of an example of a software platform implemented by an electronic computing and communications system.

In the contemporary digital landscape, information technology (IT) systems, such as those illustrated in FIG. 1 and the unified communications as a service (UCaaS) platform described with respect to FIG. 3, generate an unprecedented volume and variety of data, ranging from structured transactional records to unstructured logs and multimedia content. Traditional data storage and processing systems (e.g., relational database management systems (RDBMSs)), designed for more homogenous and predictable datasets, often present challenges in efficiently managing and analyzing this disparate influx of information. Data lakes have been developed and deployed to overcome these shortcomings.

A data lake is a centralized storage system designed to hold vast amounts of raw data in their native formats, ranging from structured to unstructured. Unlike traditional databases, data lakes can store data without predefined schemas, offering flexibility in data ingestion and retrieval. To enhance data retrieval efficiency, data lakes often use "partitions," which organize data into subsets based on common attributes. One popular format for storing data in data lakes is "Parquet," which is a columnar storage file format optimized for analytics. By using partitions and the Parquet file format, data lakes can provide faster query performance and reduced storage requirements or needs.

The term data lake, as used herein, encompasses storage aspects of data and the tools, services, and frameworks used to ingest, manage, and query the data. As such, a data lake may be queried using structured query language (SQL) statements. This capability may be facilitated or enabled by big data processing platforms, such as Apache Spark™ or Presto, amongst others. Partitions and Parquet files can be thought of as similar to traditional indexes in RDBMSs. While partitions and Parquet files don't replace the need for indexes, they optimize large-scale data processing by organizing data in a manner that enhances read performance.

Typically, when a query to an RDBMS includes filters (e.g., WHERE clauses) on columns that are not indexed, performance suffers significantly because full table scans may need to be performed. Similarly, when queries on a data lake include filters that don't correspond to partitions or aren't aligned with the columnar structure of Parquet files, performance can degrade. This is because, without the guidance of partitions or the efficiency of Parquet's columnar format, large portions of the data lake, if not its entirety, may have to be scanned to process the query.

Designing partitions based on specific fields to optimize query performance can be a challenging endeavor, especially when dealing with fields exhibiting high cardinality. High cardinality refers to fields with a large number of unique values, such as 'meetingID' in the context of queries such as 'SELECT COUNT(participant) FROM dataLake WHERE meetingID=12345.' In these situations, creating partitions tailored to such high cardinality fields may not yield the anticipated performance benefits. Instead, it can lead to the creation of an excessive number of small partitions, undermining the advantages traditionally associated with partitioning.

Implementations of this disclosure eliminate the necessity for performing exhaustive data lake scans when executing queries that involve filtering on non-partitioning fields. A non-partitioning field is one that does not align with the existing partitioning of the data lake or is not used in partitioning the data of the data lake. When an initial query (e.g., a first received query) that contains a non-partitioning field is received, a comprehensive data lake query or scan is initiated. The purpose of this scan is to establish a mapping that correlates the various values of the non-partitioning field in the data lake with the specific Parquet files in which they are stored. Subsequent queries that employ (e.g., include) the non-partitioning field as a filter undergo an automatic transformation (e.g., rewriting). The queries are rewritten to target only those Parquet files that contain the specified filter value(s) included in the query. As such, the processing performance of queries that include non-partitioning fields can be significantly improved since only a portion of the Parquet files of the data lakes are queried.

For simplicity of explanation, partitions are described herein as including only Parquet files, which themselves include schema information. However, the disclosure is not so limited. Partitions can contain data in various formats. While Parquet is a common choice for storing data within partitions due to its advantages, partitions can also contain data in other formats (e.g., JavaScript Object Notation (JSON), comma-separated values (CSV), or Avro). A data lake may include (or have associated therewith) schema information. As such, when file formats other than Parquet are used, then the techniques herein may be adapted to use data lake schema information to identify files that include particular values of a non-partitioning field.

To describe some implementations in greater detail, reference is first made to examples of hardware and software structures that may generate data to be stored in a data lake and hardware and software used to implement a system for non-partitioned field query optimization in data lakes. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be an RDBMS, an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
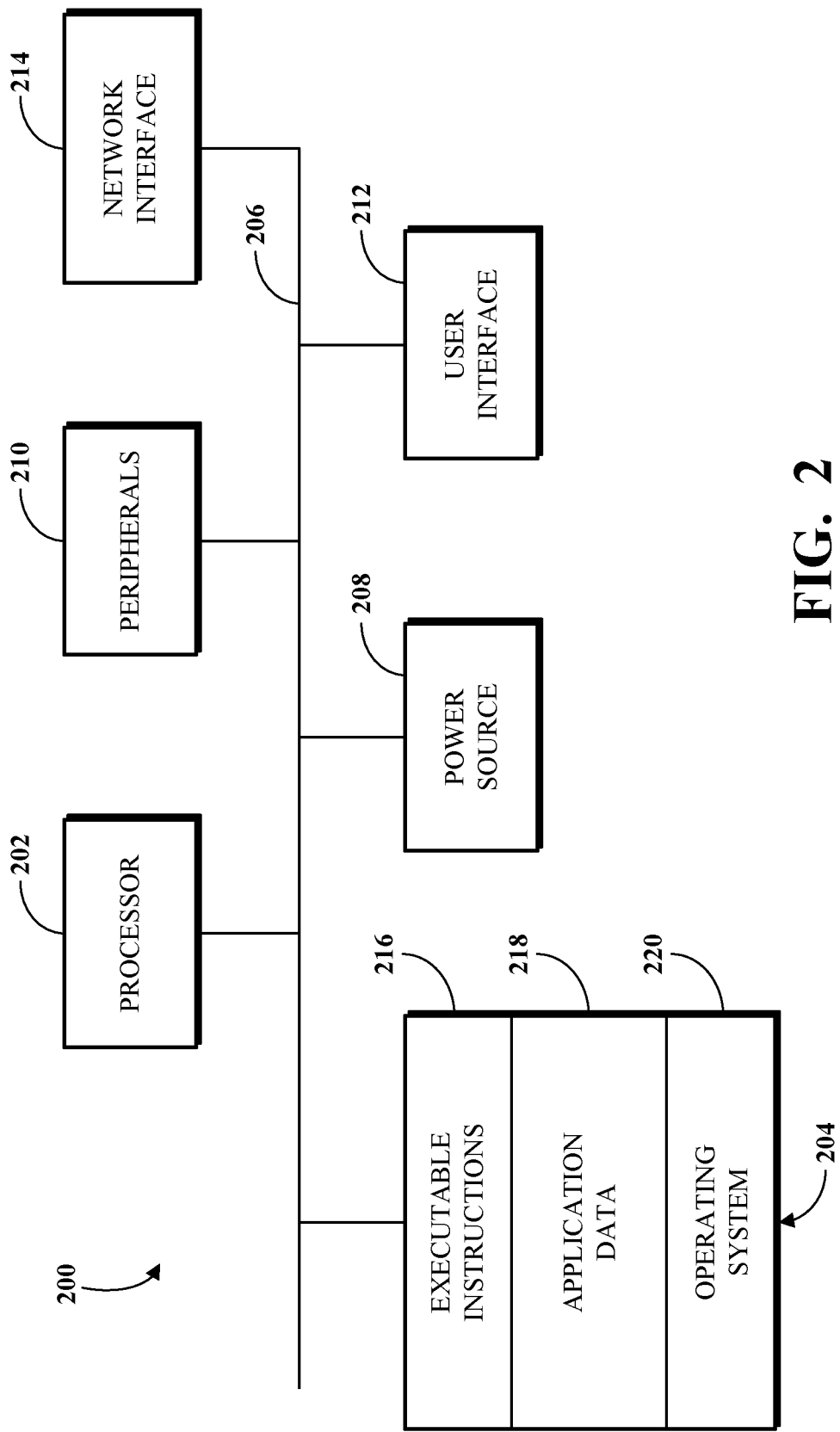
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a query software that enables querying of a data lake.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
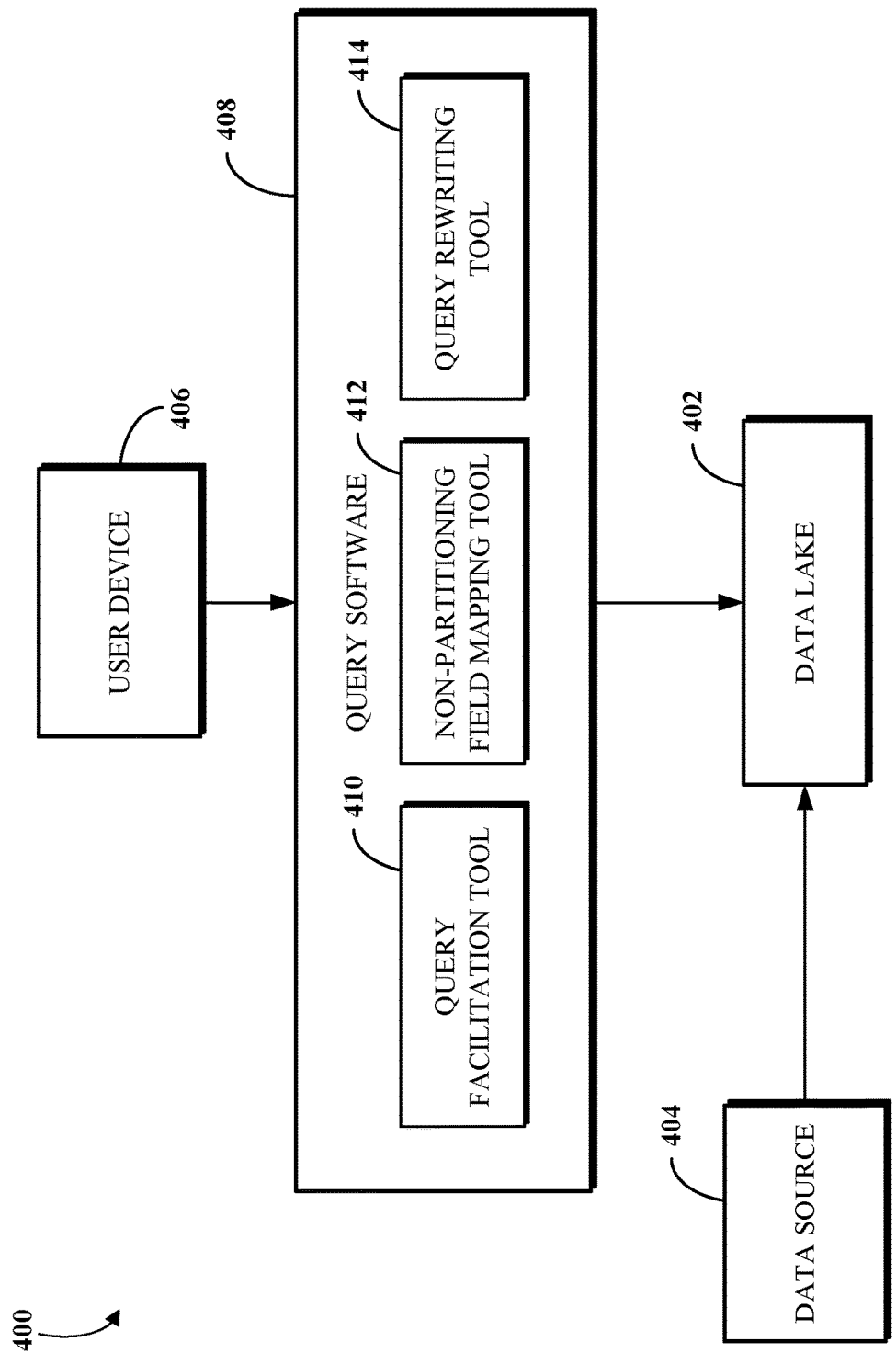
FIG. 4 is a block diagram of an example of a system for data analysis and querying.

FIG. 4 is a block diagram of an example of a system 400 for data analysis and querying. The system 400 includes a data lake 402, a data source 404, a user device 406, and query software 408.

The data source 404 serves as the origin of data, providing datasets and information to populate the data lake 402. While only one data source 404 is shown in FIG. 4, the data lake 402 can receive data from many data sources. The data source 404 can be the one or more constituents of the electronic computing and communications system 100 of FIG. 1. For example, the data source 404 can be one or more of the telephony software 312, the conferencing software 314, the messaging software 316, the other software 318, and/or respective data repositories associated therewith.

While not specifically shown in FIG. 4, the system 400 can include a range of tools and processes designed to optimize data management within the data lake 402. Such tools and processes may include data ingestion tools for collecting data from various data sources (such as the data source 404), schema management tools to define, enforce, and evolve data structures, and data transformation tools for processing and preparing data for efficient storage in the data lake 402 and for efficient querying of the data. Additionally, the system 400 may incorporate data quality and validation processes, data lifecycle management tools, and monitoring solutions to ensure data integrity, compliance, and efficient system performance.

Data in the data lake 402 can be structured into partitions, with each partition potentially containing data in various formats, such as the Parquet format, which is commonly used for efficient columnar storage. Partitions, Parquet files, and schemas can be used to efficiently organize, store, and manage data in the data lake 402. These components can be created during the data ingestion process and can be essential for optimizing query performance and ensuring data quality.

Partitions in the data lake 402 can be used to organize data by specific fields. Partitions can be created during data ingestion and can be specified using criteria (e.g., date ranges or geographic locations). Tools and platforms (e.g., such as the open source Apache Hive) include features and functionalities that facilitate the creation and management of partitions. Such tools and platforms may provide capabilities for defining and creating partitions using SQL-like syntax therewith simplifying the process of organizing and managing data within the data lake 402.

Parquet is a columnar storage format commonly used in data lakes due to its efficiency and schema-aware capabilities. Parquet files can be created as data is ingested into the data lake 402 or when data are transformed or converted into the Parquet format. Any number of tools (e.g., Apache Spark™, Apache Hive, and Apache Arrow) can be used for reading and writing data in the Parquet format. Parquet files can significantly reduce storage requirements and improve query performance. Parquet files also store schema information therein.

Schemas can be used (e.g., defined) to maintain data integrity and data consistency within the data lake 402. Schemas can define the structure of at least some of the data in the data lake 402, including data types, field names, and relationships between different data elements. Schemas can be created and enforced at various stages of data processing within the data lake 402. For example, schema inference can occur when data is initially ingested, where the schema can be derived from the data itself. Alternatively, authorized users can provide explicit schema definitions when ingesting data or transforming the data within the data lake 402. As such, the system 400 can include tools (e.g., Apache Avro and Spark SQL) that facilitate schema definition, enforcement, and evolution.

The user device 406 can be or can run on a computing device configured to access the query software 408. The user device 406 can be as described with respect to the computing device 200 of FIG. 2. Although one user device is shown in FIG. 4, more than one user device can simultaneously access the query software 408.

Via the user device 406, data queries can be submitted to the data lake 402 via the query software 408. The query software 408 can be or include interfaces or tools for data exploration and analysis. The data queries may be submitted by a user of the user device 406 via user interfaces of the query software 408. The query software 408 may enable users to formulate queries using SQL or other query languages. In another example, a data query may be submitted to the query software 408 programmatically (e.g., using application programming interfaces (APIs) of the query software 408). The query software 408 may retrieve or cause to be retrieved data of the data lake 402 in response to the queries. The query results can then be transmitted back to the user device 406, such as for display.

The query software 408 includes tools, such as programs, subprograms, functions, routines, subroutines, operations, executable instructions, and/or the like for, inter alia and as further described below, performing queries on the data stored within the data lake 402. At least some of the tools of the query software 408 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

The query software 408 is shown as including a query facilitation tool 410, a non-partitioning field mapping tool 412, and a query rewriting tool 414. In some implementations, the query software 408 can include more or fewer tools. In some implementations, some of the tools may be combined, some of the tools may be split into more tools, or a combination thereof.

Figure 5A:
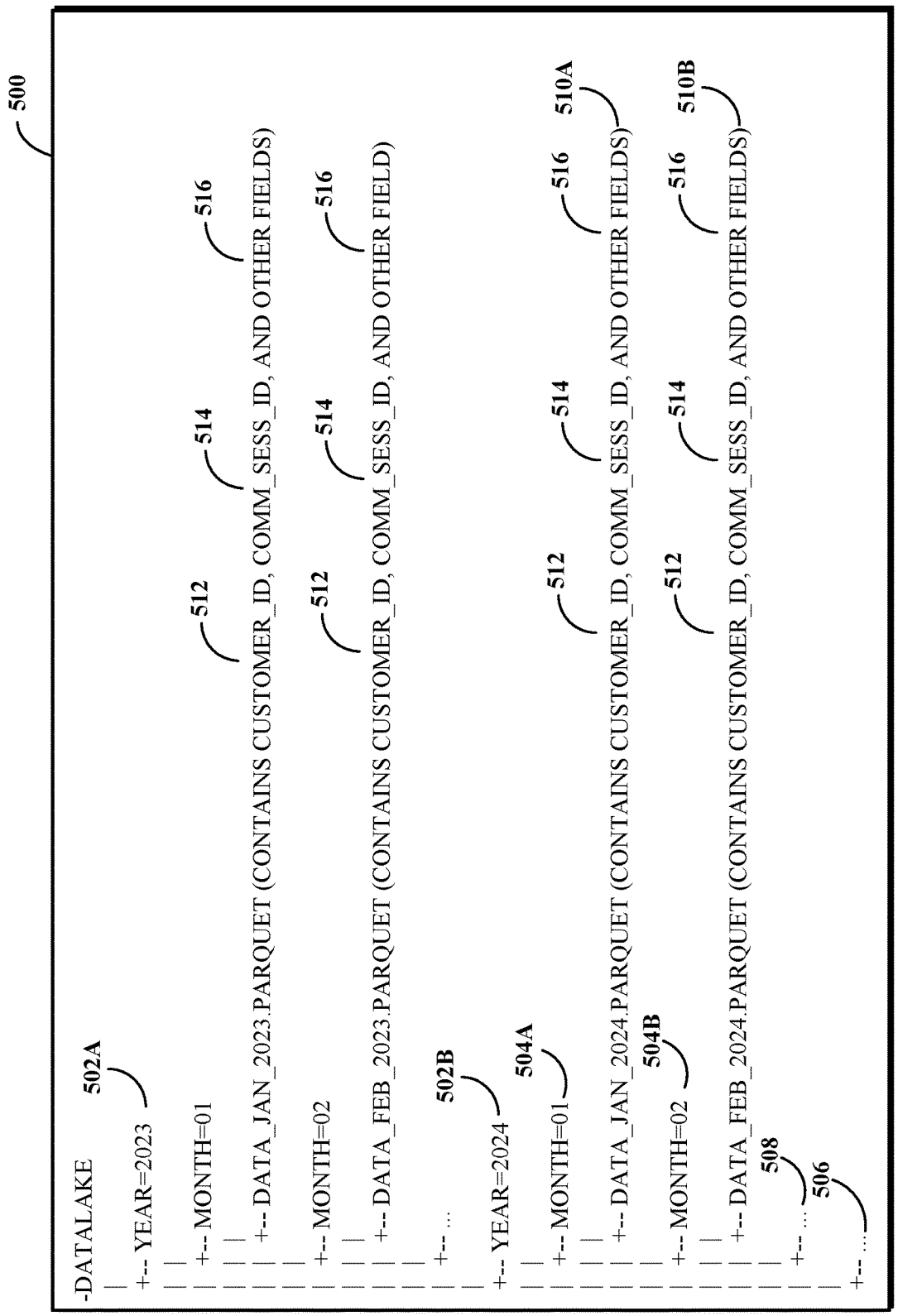
FIG. 5A illustrates a data lake (i.e., a structure therefor) that includes data pertaining to communication sessions associated with customers.

The operations of the query software 408 are explained with reference to FIGS. 5A-5D. FIG. 5A illustrates a data lake 500 (i.e., a structure of a data lake) that includes data pertaining to communication sessions associated with customers. To illustrate, a communications session can be an audio or an audio-video conference facilitated or enabled by the conferencing software 314 of FIG. 3, a telephone call facilitated or enabled by the telephony software 312 of FIG. 3, or any other communication session facilitated or enabled by the software platform 300.

The data lake 500 is structured (e.g., partitioned) by years and months, with each year representing a top-level directory (such as directories 502A, 502B) and each month (such as sub-directories 504A, 504B) as a subdirectory within the respective year directory. While two directories each including two sub-subdirectories are shown in FIG. 5A, the data lake 500 can include many more directories (as illustrated by an ellipsis 506) and many more sub-directories under each directory (as illustrated by an ellipsis 508). Within a directory corresponding to a month, Parquet files (such as Parquet files 510A, 510B) are stored with names that may reflect the month and year, containing data related to a field customer_id 512, a field communication_session_id 514, and additional fields 516. Both of the customer_id 512 and the communication_session_id 514 fields are non-partitioning fields as they are high cardinality fields. It is to be noted that the disclosure herein is not limited to the structure illustrated in FIG. 5A and the data lake 500 may also include other Parquet files with different structures and files in different formats, as well as additional or different data.

FIG. 5B illustrates an example 550 of data distribution in the data lake 500 of FIG. 5A. The example 550 illustrates that the data lake 500 includes data relating to, among others, customers having customer_ids AliceCo, BobCo, and CharlieCo. The example 550 illustrates which Parquet files in which partitions contain the customer_ids AliceCo, BobCo, and CharlieCo.

The example 550 illustrates the presence of three distinct customer IDs, namely AliceCo, BobCo, and CharlieCo, within the Parquet files of the data lake 500, which in reality may include data relating to many more customer IDs. Each row in the data lake 500 signifies a specific location and corresponding filename where data related to these customers can be found. A PATH column (e.g., a column 552) indicates the directory structure within the data lake 500, specifying the year and month of the data files. A "FILE-NAME" column (e.g., a column 554) highlights the specific Parquet file names that contain the relevant customer data.

To illustrate, rows 556, 558, and 560 indicate that the value 'AliceCo' for 'customer_id' can be found in the partitions (e.g., sub-directories) YEAR=2023/MONTH=01/, YEAR=2023/MONTH=02/, and YEAR=2024/ MONTH=01/, respectively, along with the specific Parquet files DATA_JAN_2023.PARQUET, DATA_FEB_2023. PARQUET, and DATA_JAN_2024.PARQUET, respectively; and a row 562 indicates that the value 'CharlieCo' for 'customer_id' can be found in the partition (e.g., subdirectory) YEAR=2023/MONTH=01/and the file DATA_JAN_2023.PARQUET.

The query facilitation tool 410 may receive a query from the user device 406. In an example, the system 400 may include open source or commercial query tools for performing queries on the data of the data lake 402 and the query facilitation tool 410 may be implemented as a plugin (or an add on) to such query tools. In another example, the query facilitation tool 410 may intercept a query received from the user device 406, determine whether the query includes non-partitioning fields, and if so, cause the query to be rewritten prior to forwarding the query (the received query or the rewritten query, as the case may be) to the query tool.

When a query is received, the query facilitation tool 410 determines whether the query contains filtering criteria related to non-partitioning fields. For example, the query facilitation tool 410 can parse the query to identify the presence of a 'where' clause (or equivalents thereof) and any specific fields (i.e., "filter fields") used within the filtering criteria. Such clauses typically contain conditions used to filter data based on specific filter field values. The query facilitation tool 410 can determine whether any of the filter fields is a non-partitioning field. To determine whether a field is an non-partitioning field, the query facilitation tool 410 may verify whether the field is or is not used in defining the partitions of the data lake 500. If the field is not a part of the partitioning scheme of the data lake 500, the field is considered a non-partitioning field. More generally, that a field is a non-partitioning field can include that the field is not indexed, which may impact query performance and search efficiency when filtering or searching by this field.

The query facilitation tool 410 can use various techniques and tools to determine whether a field is a non-partitioning field. The query facilitation tool 410 may use available APIs designed for exploring the structure and schema of the data lake 500. Within this context, the query facilitation tool 410 may be equipped with or have access to a Software Development Kit (SDK) capable of (e.g., that enables) programmatic interaction with the data lake 500. The APIs may enable tasks such as listing directories and files, retrieving metadata, and interrogating the structural layout of the data lake 500.

Whether a field is a non-partitioning field can be intricately tied to the directory structure of the data lake 500. The organization of data within directories and subdirectories may mirror the underlying partitioning scheme of the data lake 500. Each directory may signify a specific partition key value or a combination thereof. As such, the query facilitation tool 410 can programmatically compile a list of directories and to identify the partitioning structure. In addition, some data lakes augment their data storage with metadata tags or attributes linked to files or directories. These tags effectively encapsulate information about partitioning. By leveraging (e.g., interrogating) such metadata, the query facilitation tool 410 can effectively identify the partitioning strategy of the data lake 500. Moreover, the data lake 500 may integrate with a metadata catalog or a metastore (e.g., Apache Hive Metastore) to enhance data management. As such, the query facilitation tool 410 can programmatically query such catalogs to extract information regarding the structure and partitioning of the data lake 500. As such, whether a filter field is a partitioning field can be determined based on a directory structure (and/or information associated therewith) of the data lake 500.

Furthermore, schema data associated with the data lake 500 can be used to determine whether a field is unpartitioned. The schema information encompasses details about the structure, data types, and relationships of the datasets within the data lake. By analyzing this schema data, the query facilitation tool 410 can identify whether a specific field is actively used as a partition key or if it's merely part of the dataset without a role in the partitioning strategy Other ways of identifying partitioning information as possible. As such, that a filter field included in the query is not a partitioning field can be determined in response to determining that an index is not associated with the filter field.

If a filter field is not a partitioning field, then the query facilitation tool 410 determines that the filter field is a non-partitioning field. In response to determining that the filter field is not a partitioning field, the query facilitation tool 410 determines whether a mapping between values of the non-partitioning field and containing Parquet files of the data lake 500 exists. As mentioned above, the data lake 500 may include many Parquet files. At least some of the Parquet files may contain values of the non-partitioning field. A Parquet file that contains a value of the non-partitioning field is referred to as a "containing Parquet file." To illustrate with reference to FIG. 5B, the files DATA_JAN_2023.PARQUET, DATA_FEB_2023.PARQUET, and DATA_JAN_2024.PARQUET are containing Parquet files. If a mapping does not exist, then the query facilitation tool 410 directs the non-partitioning field mapping tool 412 to generate the mapping.

Given a field name, the non-partitioning field mapping tool 412 generates a mapping from the specific values of the non-partitioning field found in the data lake 500 and the Parquet files that include those values. FIG. 5C illustrates sample code 570 for generating a mapping similar to that shown in FIG. 5B. The sample code 570 is but one illustration of an implementation of generating a mapping between values of a non-partitioning field and containing Parquet files. Other implementations are possible. The sample code 570 is written in the Python programming language and uses the PySpark library, which is the Python API for the distributed data processing framework Apache Spark. PySpark can be used to facilitate interaction with and processing of large-scale datasets using Python. The sample code 570 uses the DataFrame API of PySpark to read Parquet files, manipulate data, and perform operations on the data. The sample code 570 can be implemented by the non-partitioning field mapping tool 412 of FIG. 4.

At line 572, the sample code 570 implements (e.g., defines) a function generate_mapping( ) that takes field_name and data_lake_root as input arguments. The field_name can be the name of the non-partitioning field (e.g., 'customer_id') and data_lake_root can be the root directory (e.g., 's3://DL/') of the data lake 500. At line 574, a Spark session, which is the entry point for using Spark functionality, is created. At line 576, all Parquet files with merged schema are recursively read from the data lake 500. The "**/*.Parquet" wildcard can be used to include Parquet files from subdirectories.

At line 578, it is checked whether the specified field exists in the DataFrame by verifying whether field_name is in the columns of the DataFrame. At line 580, if the specified field exists, null values in that field are filled with "Unknown" and rows where the field is null are filtered out. At line 582, a new DataFrame named result is created. The result DataFrame contains the specified field (i.e.,field_name), "file_path," and "file_name." The distinct( ) function can be used to remove duplicate rows. The result DataFrame is the mapping between the values of the non-partitioning field and their containing Parquet files. The result DataFrame can be returned and cached in a memory for access by the query rewriting tool 414 of FIG. 4.

FIG. 5D illustrates sample code 590 for generating a mapping similar to that shown in FIG. 5B. The sample code 590 is also written in the Python programming language and uses the PySpark library. At line 592, Parquet files are read from the data lake, their schemas are merged, and a DataFrame (df) containing the data from these Parquet files is created. At a line 594, a temporary SQL view is created in Apache Spark based on the DataFrame df By creating the temporary SQL view, it becomes possible to write SQL queries against the DataFrame df. In this case, the view is named "Parquet_data" and can be used in subsequent SQL queries to interact with the data stored in the DataFrame as if it were a SQL table. The SQL statement starting at a line 596 retrieves data from the "Parquet_data" view, including the specified field, file path, and file name columns. The result is stored in a result_df DataFrame. The result_df DataFrame includes the mapping that is similar to the data of the example 550 of FIG. 5B.

Referring again to FIG. 4, the query rewriting tool 414 can be used to rewrite a query that includes a non-partitioning field. The query can be rewritten based on the mapping so that specific Parquet files of the data lake 500 are queried instead of querying the whole data lake. To illustrate, assume that the query "select count(distinct comm_sess_id) from data_lake where customer_id='AliceCo'" was received. The query rewriting tool 414 may rewrite the received query to essentially be similar to the rewritten query shown in Table I. It is noted that there can be more than one way of rewriting a received query based on the created mapping.

TABLE I

Rewritten Query

SELECT COUNT(comm_sess_id)
FROM (
　SELECT
　FROM YEAR=/DL/YEAR=2023/MONTH=01/DATA_JAN_2023.PARQUET
　WHERE customer_id = 'AliceCo'
　UNION ALL
　SELECT
　FROM YEAR=/DL/YEAR=2023/MONTH-02/DATA_FEB_2023.PARQUET
　WHERE customer_id = 'AliceCo'
　UNION ALL
　SELECT *
　FROM YEAR=/DL/YEAR=2024/MONTH=01/DATA_JAN_2024.PARQUET
　WHERE customer_id = 'AliceCo'
) AS t;

The received query can include various filtering conditions, such as equality checks (e.g., customer_id='AliceCo'), inclusion of specific values (e.g., customer_id IN ('AliceCo', 'CharlieCo')), patterns (e.g., customer_id LIKE 'A %'), or ranges (e.g., customer_id BETWEEN 'AliceCo' AND 'BobCo'). To rewrite these queries, the query rewriting tool 414 first identifies the Parquet files associated with the specified conditions by querying the mapping.

For instance, when an inclusion condition is received, such as customer_id IN ('AliceCo', 'CharlieCo'), the query rewriting tool 414 executes a SQL statement such as "SELECT*FROM mapping WHERE customer_id IN ('AliceCo', 'CharlieCo')" to locate the relevant Parquet files for rewriting the received query. Similarly, for pattern-based queries such as "customer_id LIKE 'A %'," the query rewriting tool 414 can execute "SELECT*FROM mapping WHERE customer_id LIKE 'A %'." For range queries, such as "customer_id BETWEEN 'AliceCo' AND 'BobCo'," the query rewriting tool 414 executes "SELECT*FROM mapping WHERE customer_id BETWEEN 'AliceCo' AND 'BobCo'."

After re-writing the query, the query facilitation tool 410 may or may not cause the query (i.e., the rewritten query) to be executed.

Figure 6:
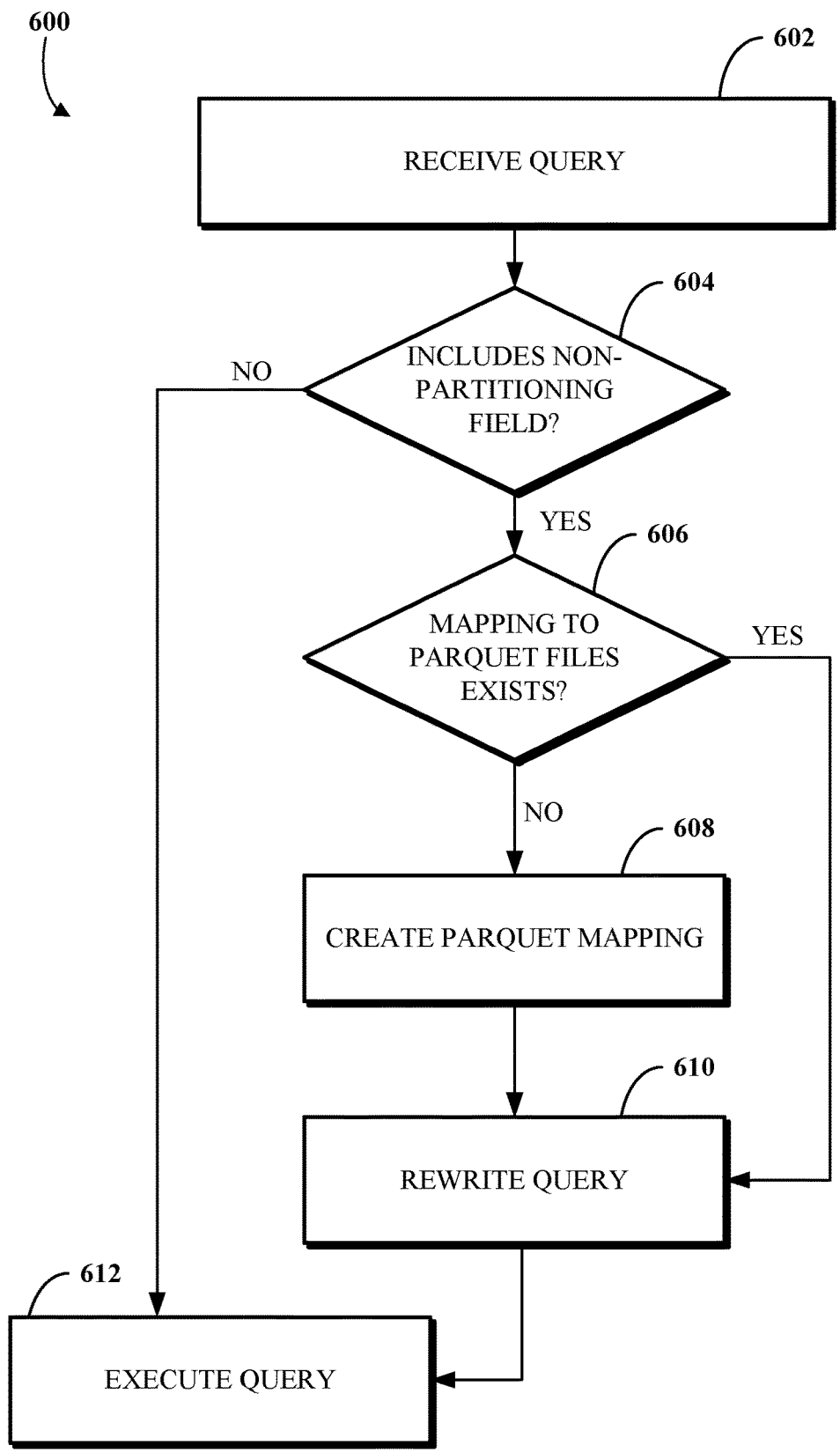
FIG. 6 is a flowchart of an example of a technique for processing a query of a data lake.

To further describe some implementations in greater detail, reference is next made to examples of techniques which may be performed by or using a system for querying a data lake. FIG. 6 is a flowchart of an example of a technique 600 for processing a query of a data lake, such as the data lake 402 of FIG. 4. The technique 600 can be executed using computing devices, such as the systems, hardware, and software described with respect to FIGS. 1-5D. The technique 600 can be performed, for example, by executing a machine-readable program or other computer-executable instructions, such as routines, instructions, programs, or other code. The steps, or operations, of the technique 600, or another technique, method, process, or algorithm described in connection with the implementations disclosed herein can be implemented directly in hardware, firmware, software executed by hardware, circuitry, or a combination thereof. The technique 600 can be implemented, at least in part, by a query software, such as the query software 408 of FIG. 4.

At 602, a query is received. The query can be received at the query software from a user device, such as the user device 406 of FIG. 4. The query may originate from an application, a script, or any other source capable of sending queries to the data lake (e.g., the data lake system). At 604, the query software determines whether the query includes filtering criteria on a non-partitioning field. If the query includes filtering criteria on a non-partitioning field, then the technique 600 proceeds to 606; otherwise the technique 600 proceeds to 612 to execute the received query. In an example, executing the received query can include passing, such as programmatically, the received query to a data lake execution engine for execution. While not specifically shown in FIG. 6, the results of the query can be returned (e.g., transmitted) to the user device.

At 606, the technique 600 determines whether a mapping between values of the non-partitioning field and the Parquet files of the data lake exists. If the mapping does not exist, then the technique 600 proceeds to 608 to create the mapping; otherwise, the technique 600 proceeds to 610 to rewrite the received query based on the mapping. At 608, the mapping can be created, as described herein with respect to the non-partitioning field mapping tool 412 of FIG. 4. At 610, the received query is rewritten, as described with respect to the query rewriting tool 414. At 612, the query is executed. The query that is executed is either the received query (if the query did not need to be rewritten) or the rewritten query, as the case may be. Executing the query includes transmitting the query to a data lake execution engine.

Figure 7:
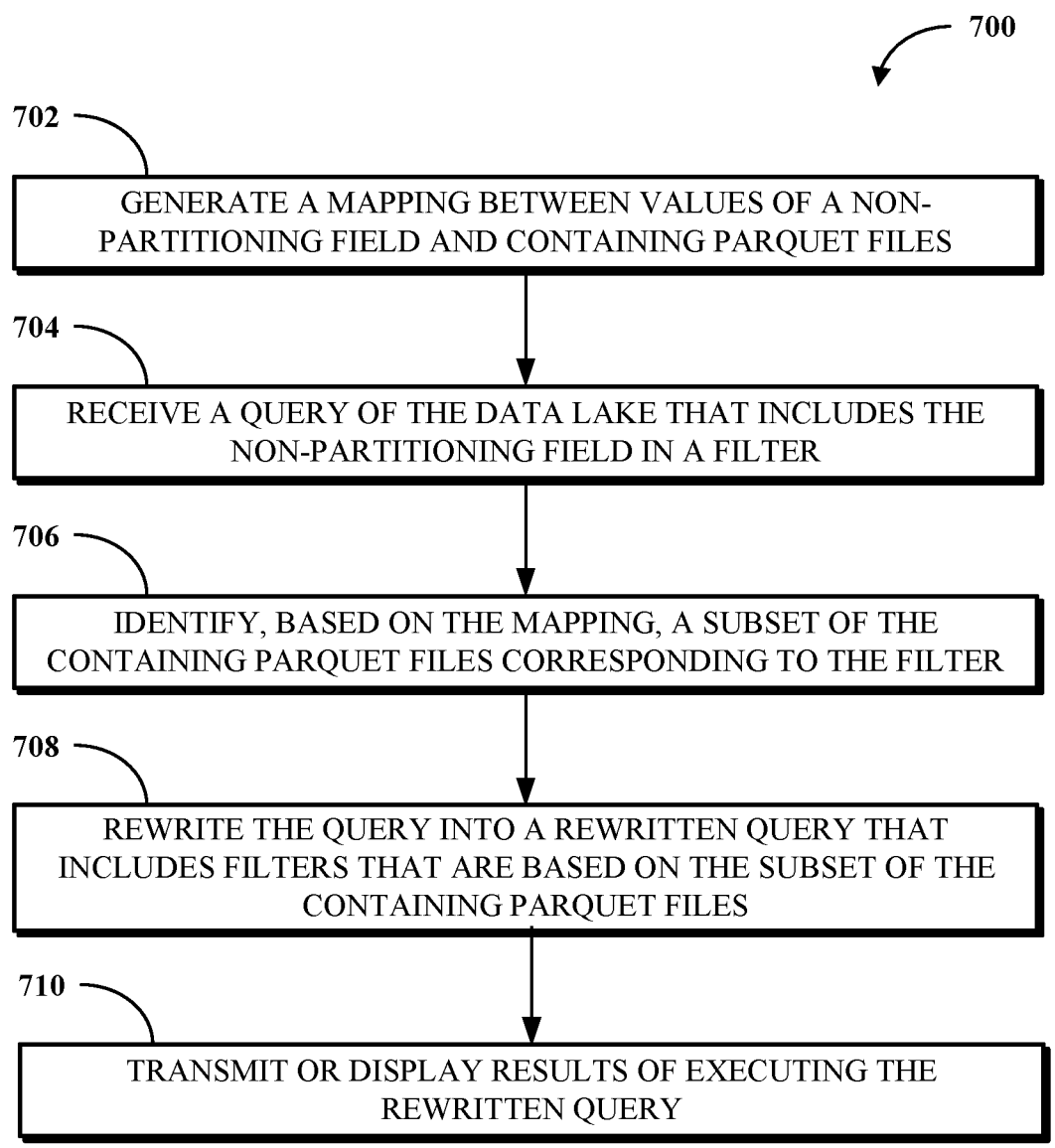
FIG. 7 is a flowchart of an example of a technique for query rewriting in a data lake system.

FIG. 7 is a flowchart of an example of a technique 700 for query rewriting in a data lake system. The technique 700 can be executed using computing devices, such as the systems, hardware, and software described with respect to FIGS. 1-5D. The technique 700 can be performed, for example, by executing a machine-readable program or other computer-executable instructions, such as routines, instructions, programs, or other code. The steps, or operations, of the technique 700, or another technique, method, process, or algorithm described in connection with the implementations disclosed herein can be implemented directly in hardware, firmware, software executed by hardware, circuitry, or a combination thereof. The technique 700 can be implemented, at least in part, by a query software, such as the query software 408 of FIG. 4.

At 702, a mapping is generated between values of a non-partitioning field and containing Parquet files of a data lake. The data lake can be data lake 500 of FIG. 5A. The mapping can be as described with respect to the example 550 of FIG. 5B. The data lake can be organized into partitions and Parquet files. Each partition can include a subset of the Parquet files. The containing Parquet files are those of Parquet files that include the values of the non-partitioning field. Generating the mapping can include identifying, for each Parquet file of the Parquet files of a data lake, whether that Parquet file includes the non-partitioning field as a column. In an example, the mapping may be generated by performing a SQL query, such as described with respect to FIG. 5D.

In an example, the mapping can be created in response to receiving an initial query of the data lake that includes the non-partitioning field as a filter. The mapping can be cached into memory for fast access, including various types such as low-latency, high-speed RAM and distributed memory systems to enable efficient data retrieval and sharing across multiple nodes or clusters therewith contributing to enhanced scalability and query performance of the mapping.

At 704, a query of the data lake that includes the non-partitioning field in a filter is received. The query can be received from a user device, such as the user device 406 of FIG. 4. As described above, the filter can be a range of values of the non-partitioning field, a pattern of the values of the non-partitioning field, or an equality condition on one or more values of the non-partitioning field. The received query can be the initial query that causes the mapping to be generated.

At 706, a subset of the containing Parquet files corresponding to the filter are identified, as described above. At 708, the received query is rewritten to a rewritten query that includes filters that are based on the subset of the containing Parquet files. The technique 700 can then cause the rewritten query to be executed (e.g., performed), such as by a query system of the data lake. At 710, the results of the rewritten query can be transmitted back to the user device. The results can be displayed (e.g., caused to be displayed) at the user device.

For simplicity of explanation, the techniques 600 and 700 of FIGS. 6 and 7, respectively, are each depicted and described herein as a respective series of steps or operations. However, the respective steps or operations of the techniques 600 and 700 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method. The method includes generating a mapping between values of a non-partitioning field and containing parquet files of a data lake, the containing parquet files including the values of the non-partitioning field and the data lake being organized into partitions and parquet files, each partition including a subset of the parquet files; receiving a query of the data lake that includes the non-partitioning field in a filter; identifying, based on the mapping, a subset of the containing parquet files corresponding to the filter; rewriting the query into a rewritten query that includes filters that are based on the subset of the containing parquet files; and transmitting or displaying results of executing the rewritten query. Other embodiments of this aspect include corresponding computer systems, apparatus, and computer programs recorded on one or more computer storage devices, each configured to perform the actions of the methods.

Implementations may include one or more of the following features. The method where generating the mapping between the values of the non-partitioning field and the containing parquet files of the data lake may include: generating the mapping in response to receiving an initial query of the data lake that includes the non-partitioning field as a filter field. The method may include: caching the mapping in a memory. Generating the mapping between the values of the non-partitioning field and the parquet files may include: performing a structured query language (SQL) query to generate the mapping. Generating the mapping between the values of the non-partitioning field and the parquet files may include: for each parquet file of the parquet files of a data lake, identifying whether the each parquet file includes the non-partitioning field as a column. The filter may include a range of the values of the non-partitioning field. The filter may include a pattern of the values of the non-partitioning field. The filter may include an equality condition. Receiving the query of the data lake that includes the non-partitioning field as the filter may include: determining that a filter field included in the query is not a partitioning field based on a directory structure of the data lake, where the filter field is the non-partitioning field. Receiving the query of the data lake that includes the non-partitioning field as the filter may include: determining that a filter field included in the query is not a partitioning field in response to determining that an index is not associated with the non-partitioning field. Implementations of the described techniques may include hardware, a method or process, or computer software on a computer-accessible medium.

One general aspect includes a system. The system includes one or more memories and one or more processors. The one or more processors can be configured to execute instructions stored in the one or more memories to: generate a mapping between values of a non-partitioning field and containing parquet files of a data lake, the containing parquet files including the values of the non-partitioning field and the data lake being organized into partitions and parquet files, each partition including a subset of the parquet files; receive a query of the data lake that includes the non-partitioning field in a filter; identify, based on the mapping, a subset of the containing parquet files corresponding to the filter; rewrite the query into a rewritten query that includes filters that are based on the subset of the containing parquet files; and transmit or display results of executing the rewritten query. Other embodiments of this aspect include corresponding computer systems, apparatus, and computer programs recorded on one or more computer storage devices, each configured to perform the actions of the methods.

Implementations may include one or more of the following features. The system where the mapping is generated in response to receiving an initial query that is different from the query and that includes the non-partitioning field as a filter field. The mapping can be generated in response to receiving the query. The one or more processors can be configured to execute instructions in the one or more memories to: determine that the filter may include a range of the values of the non-partitioning field. The one or more processors can be configured to execute instructions in the one or more memories to: determine that the filter may include a pattern of the values of the non-partitioning field. The one or more processors can be configured to execute instructions in the one or more memories to: determine that the filter may include an equality condition on a value of the non-partitioning field. The mapping can include rows and where each row includes a respective value of the non-partitioning field and a respective corresponding parquet file. Implementations of the described techniques may include hardware, a method or process, or computer software on a computer-accessible medium.

One general aspect includes a non-transitory computer readable medium storing instructions operable to cause one or more processors to perform operations. The operations can include generating a mapping between values of a non-partitioning field and containing parquet files of a data lake, the containing parquet files including the values of the non-partitioning field and the data lake being organized into partitions and parquet files, each partition including a subset of the parquet files; receiving a query of the data lake that includes the non-partitioning field in a filter; identifying, based on the mapping, a subset of the containing parquet files corresponding to the filter; rewriting the query into a rewritten query that includes filters that are based on the subset of the containing parquet files; and transmitting or displaying results of executing the rewritten query. Other embodiments of this aspect include corresponding computer systems, apparatus, and computer programs recorded on one or more computer storage devices, each configured to perform the actions of the methods.

Implementations may include one or more of the following features. The non-transitory computer readable medium where the mapping can be generated in response to receiving the query. The operations may include: transmitting the rewritten query to a query execution engine. Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
generating a mapping between values of a non-partitioning field and containing Parquet files of a data lake, the mapping correlates unique values of the non-partitioning field with specific Parquet files in which the unique values are stored, and the containing Parquet files including the values of the non-partitioning field and the data lake being organized into partitions and Parquet files, wherein generating the mapping between the values of the non-partitioning field and the Parquet files comprises:
for each Parquet file of the Parquet files of the data lake, identifying whether the each Parquet file includes the non-partitioning field as a column;
receiving a query of the data lake that includes the non-partitioning field in a filter;
identifying, based on the mapping, a subset of the containing Parquet files corresponding to the filter;
rewriting the query into a rewritten query that includes filters that are based on the subset of the containing Parquet files, the rewritten query specifies the containing Parquet files; and
transmitting or displaying results of executing the rewritten query.

2. The method of claim 1, wherein generating the mapping between the values of the non-partitioning field and the containing Parquet files of the data lake comprises:
generating the mapping in response to receiving an initial query of the data lake that includes the non-partitioning field as a filter field.

3. The method of claim 1, further comprising:
caching the mapping in a memory.

4. The method of claim 1, wherein generating the mapping between the values of the non-partitioning field and the Parquet files comprises:
performing a Structured Query Language (SQL) query to generate the mapping.

5. The method of claim 1, wherein the filter comprises a range of the values of the non-partitioning field.

6. The method of claim 1, wherein the filter comprises a pattern of the values of the non-partitioning field.

7. The method of claim 1, wherein the filter comprises an equality condition.

8. The method of claim 1, wherein receiving the query of the data lake that includes the non-partitioning field as the filter comprises:
determining that a filter field included in the query is a non-partitioning field based on a directory structure of the data lake, wherein the filter field is the non-partitioning field.

9. The method of claim 1, wherein receiving the query of the data lake that includes the non-partitioning field as the filter comprises:
determining that a filter field included in the query is a non-partitioning field in response to determining that an index is not associated with the non-partitioning field.

10. A system, comprising:
one or more memories; and
one or more processors, the one or more processors configured to execute instructions stored in the one or more memories to:
generate a mapping between values of a non-partitioning field and containing Parquet files of a data lake, the mapping correlates unique values of the non-partitioning field with specific Parquet files in which the unique values are stored, and the containing Parquet files including the values of the non-partitioning field and the data lake being organized into partitions and Parquet files, wherein to generate the mapping between the values of the non-partitioning field and the Parquet files comprises to:
for each Parquet file of the Parquet files of the data lake, identify whether the each Parquet file includes the non-partitioning field as a column;
receive a query of the data lake that includes the non-partitioning field in a filter;
identify, based on the mapping, a subset of the containing Parquet files corresponding to the filter;
rewrite the query into a rewritten query that includes filters that are based on the subset of the containing Parquet files, the rewritten query specifies the containing Parquet files; and
transmit or display results of executing the rewritten query.

11. The system of claim 10, wherein the mapping is generated in response to receiving an initial query that is different from the query and that includes the non-partitioning field as a filter field.

12. The system of claim 10, wherein the mapping is generated in response to receiving the query.

13. The system of claim 10, wherein the one or more processors is further configured to execute instructions in the one or more memories to:
determine that the filter comprises a range of the values of the non-partitioning field.

14. The system of claim 10, wherein the one or more processors is further configured to execute instructions in the one or more memories to:
determine that the filter comprises a pattern of the values of the non-partitioning field.

15. The system of claim 10, wherein the one or more processors is further configured to execute instructions in the one or more memories to:
determine that the filter comprises an equality condition on a value of the non-partitioning field.

16. The system of claim 10, wherein the mapping includes rows and wherein each row includes a respective value of the non-partitioning field and a respective corresponding Parquet file.

17. A non-transitory computer readable medium storing instructions operable to cause one or more processors to perform operations comprising:
generating a mapping between values of a non-partitioning field and containing Parquet files of a data lake, the mapping correlates unique values of the non-partitioning field with specific Parquet files in which the unique values are stored, and the containing Parquet files including the values of the non-partitioning field and the data lake being organized into partitions and Parquet files, wherein to generating the mapping between the values of the non-partitioning field and the Parquet files comprises:

for each Parquet file of the Parquet files of the data lake, identifying whether the each Parquet file includes the non-partitioning field as a column;

receiving a query of the data lake that includes the non-partitioning field in a filter;

identifying, based on the mapping, a subset of the containing Parquet files corresponding to the filter;

rewriting the query into a rewritten query that includes filters that are based on the subset of the containing Parquet files, the rewritten query specifies the containing Parquet files; and transmitting or displaying results of executing the rewritten query.

18. The non-transitory computer readable medium of claim 17, wherein the mapping is generated in response to receiving the query.

19. The non-transitory computer readable medium of claim 17, wherein the operations further comprising:
    transmitting the rewritten query to a query execution engine.

20. The non-transitory computer readable medium of claim 17, wherein the operations further comprise:
    generating the mapping in response to receiving an initial query that is different from the query and that includes the non-partitioning field as a filter field.

* * * * *